(12) United States Patent
Henderson et al.

(10) Patent No.: US 8,171,726 B2
(45) Date of Patent: May 8, 2012

(54) SOFTWARE, METHODS AND SYSTEMS INCLUDING SOOT LOADING METRICS

(75) Inventors: Greg Henderson, Columbus, IN (US); Brent Engel, Hope, IN (US)

(73) Assignee: Cummins Inc., Columbus, IN (US)

( * ) Notice: Subject to any disclaimer, the term of this patent is extended or adjusted under 35 U.S.C. 154(b) by 1072 days.

(21) Appl. No.: 12/004,464

(22) Filed: Dec. 20, 2007

(65) Prior Publication Data
US 2008/0202103 A1 Aug. 28, 2008

Related U.S. Application Data

(60) Provisional application No. 60/876,881, filed on Dec. 22, 2006.

(51) Int. Cl.
*F01N 3/00* (2006.01)

(52) U.S. Cl. ............... 60/295; 60/285; 60/286

(58) Field of Classification Search ............ 60/295
See application file for complete search history.

(56) References Cited

U.S. PATENT DOCUMENTS

| | | | |
|---|---|---|---|
| 5,157,340 A | 10/1992 | Walton et al. | |
| 5,551,971 A | 9/1996 | Chadderton et al. | |
| 6,947,831 B2 | 9/2005 | van Nieuwstadt | |
| 6,952,920 B2 | 10/2005 | Shirakawa | |
| 7,031,827 B2 | 4/2006 | Trudell et al. | |
| 7,047,729 B2 | 5/2006 | van Nieuwstadt et al. | |
| 2004/0103654 A1* | 6/2004 | Ohtake et al. | 60/295 |
| 2004/0118110 A1* | 6/2004 | Kondo et al. | 60/295 |
| 2004/0226287 A1 | 11/2004 | Edgar et al. | |
| 2005/0086929 A1 | 4/2005 | van Nieuwstadt et al. | |
| 2005/0178207 A1* | 8/2005 | Stegmaier et al. | 73/708 |
| 2006/0016180 A1 | 1/2006 | Tomita et al. | |
| 2006/0090458 A1 | 5/2006 | Marcelot et al. | |
| 2006/0242950 A1* | 11/2006 | Wang et al. | 60/295 |
| 2006/0260299 A1 | 11/2006 | Wang et al. | |
| 2007/0056271 A1 | 3/2007 | Berryhill et al. | |
| 2007/0056272 A1 | 3/2007 | Dollmeyer et al. | |
| 2007/0056273 A1 | 3/2007 | Wills | |
| 2007/0056274 A1 | 3/2007 | Wills | |
| 2007/0061064 A1 | 3/2007 | Dollmeyer et al. | |
| 2007/0074508 A1 | 4/2007 | Tomlins et al. | |

FOREIGN PATENT DOCUMENTS

| | | |
|---|---|---|
| EP | 1744042 A9 | 1/2007 |
| WO | WO 92/02807 | 2/1992 |
| WO | WO 95/16853 | 6/1995 |

\* cited by examiner

*Primary Examiner* — Thomas Denion
*Assistant Examiner* — Jason Shanske
(74) *Attorney, Agent, or Firm* — Krieg DeVault LLP

(57) ABSTRACT

One embodiment is a method including a unique soot loading metric. The method includes treating exhaust with a soot filter, sensing information including a pressure differential of the soot filter, a temperature of the soot filter, an ambient pressure, an air flow, and a fuel flow, evaluating the information to determine a value, and commanding a regeneration of the soot filter based upon the evaluating. The evaluating the information to determine the value accounts for a first contribution to the pressure differential attributable to laminar flow wall friction and a second contribution to the pressure differential attributable to turbulent flow. Another embodiment is a system including a unique soot loading metric. The system includes an exhaust aftertreatment subsystem including a soot filter, a controller operable to receive information of a pressure differential of the soot filter, a temperature of the soot filter, an ambient pressure, an air flow, and a fuel flow, to evaluate the information to produce a value, the value accounting for a laminar flow contribution to the pressure differential and a turbulent flow contribution to the pressure differential, and to command regeneration of the soot filter based upon the value.

24 Claims, 14 Drawing Sheets

Fig. 4  Kinematic Viscosity of Air

Fig. 5   Test Cell Soot Loading Metric Correlation

Fig. 7 Clean Filter Metric Values - Regeneration Mode

Fig. 8    Soot Load Correlation to Improved Metric and dP/Q

Fig. 9  Soot Load Prediction Capability - Improved Metric vs. dP/Q

Fig. 10  Clean Filter Metric Values - Regeneration Mode

Fig. 12 Behaviour of dP/Q Metric During Regeneration Event (Initial Soot Load = 60g)

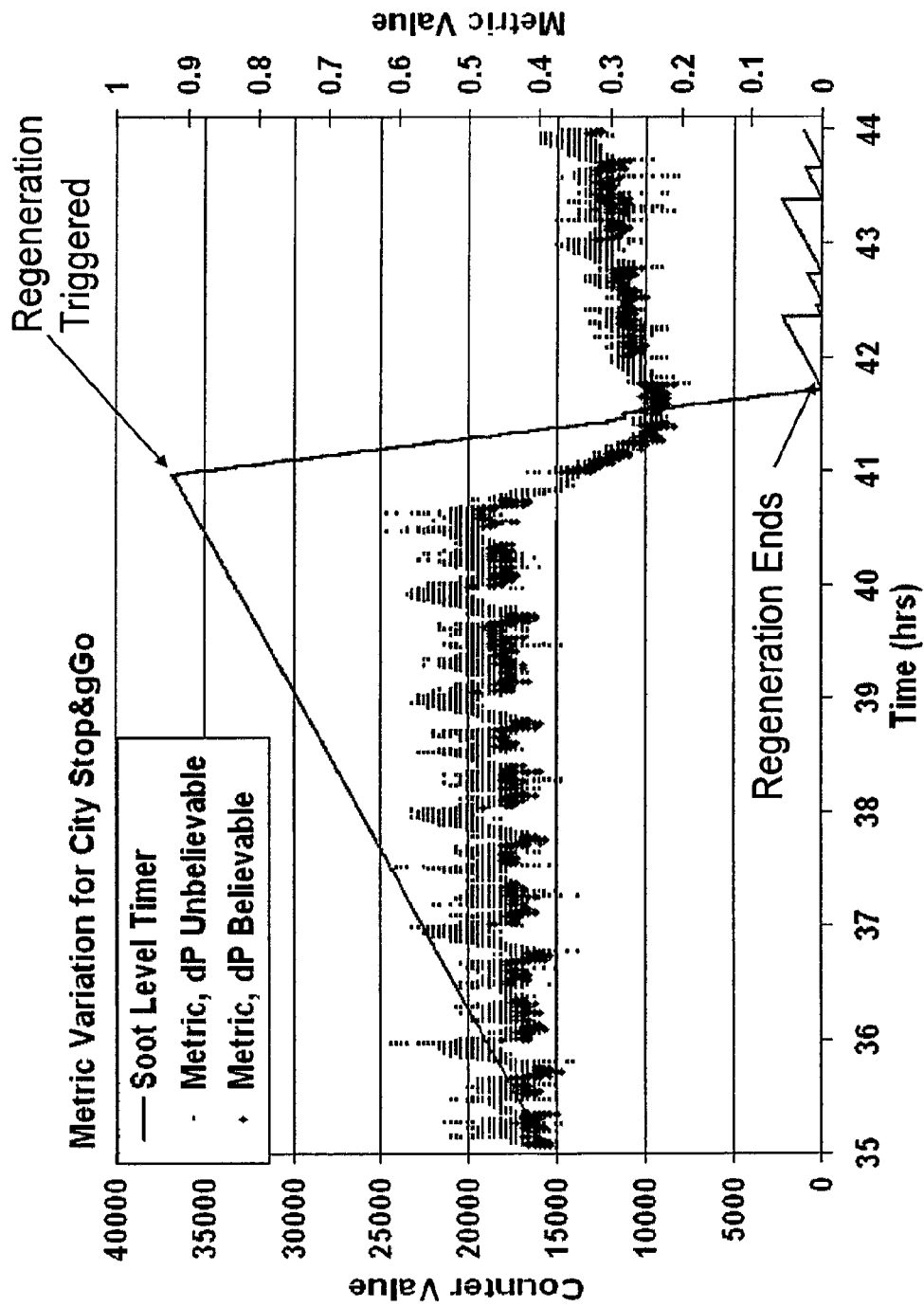
Fig. 14  Test Cell Simulation of City Stop & Go Route

SOFTWARE, METHODS AND SYSTEMS INCLUDING SOOT LOADING METRICS

PRIORITY

The benefits and rights of priority of U.S. patent application No. 60/876,881 filed Dec. 22, 2006 are claimed, and that application is incorporated by reference.

BACKGROUND

Internal combustion engines including diesel engines produce a number of combustion products including particulates, hydrocarbons ("HC"), carbon monoxide ("CO"), oxides of nitrogen ("NOx"), and oxides of sulfur ("SOx"). Aftertreatment systems may be utilized to reduce or eliminate emissions of these and other combustion products. Diesel particulate filters, such as catalyzed soot filters and others, can be used to trap diesel particulate matter and reduce emissions. Diesel particulate filters may undergo soot regeneration or desoot to eliminate trapped diesel particulate matter. There is a need for metrics operable to determine or estimate soot loading of diesel particulate filters or soot filters.

SUMMARY

One embodiment is a method including a unique soot loading metric. Further embodiments, forms, objects, features, advantages, aspects, and benefits shall become apparent from the following description and drawings.

BRIEF DESCRIPTION OF THE FIGURES

FIG. 14 is a graph of counter and soot load metric versus time.

DETAILED DESCRIPTION

Figure 1:
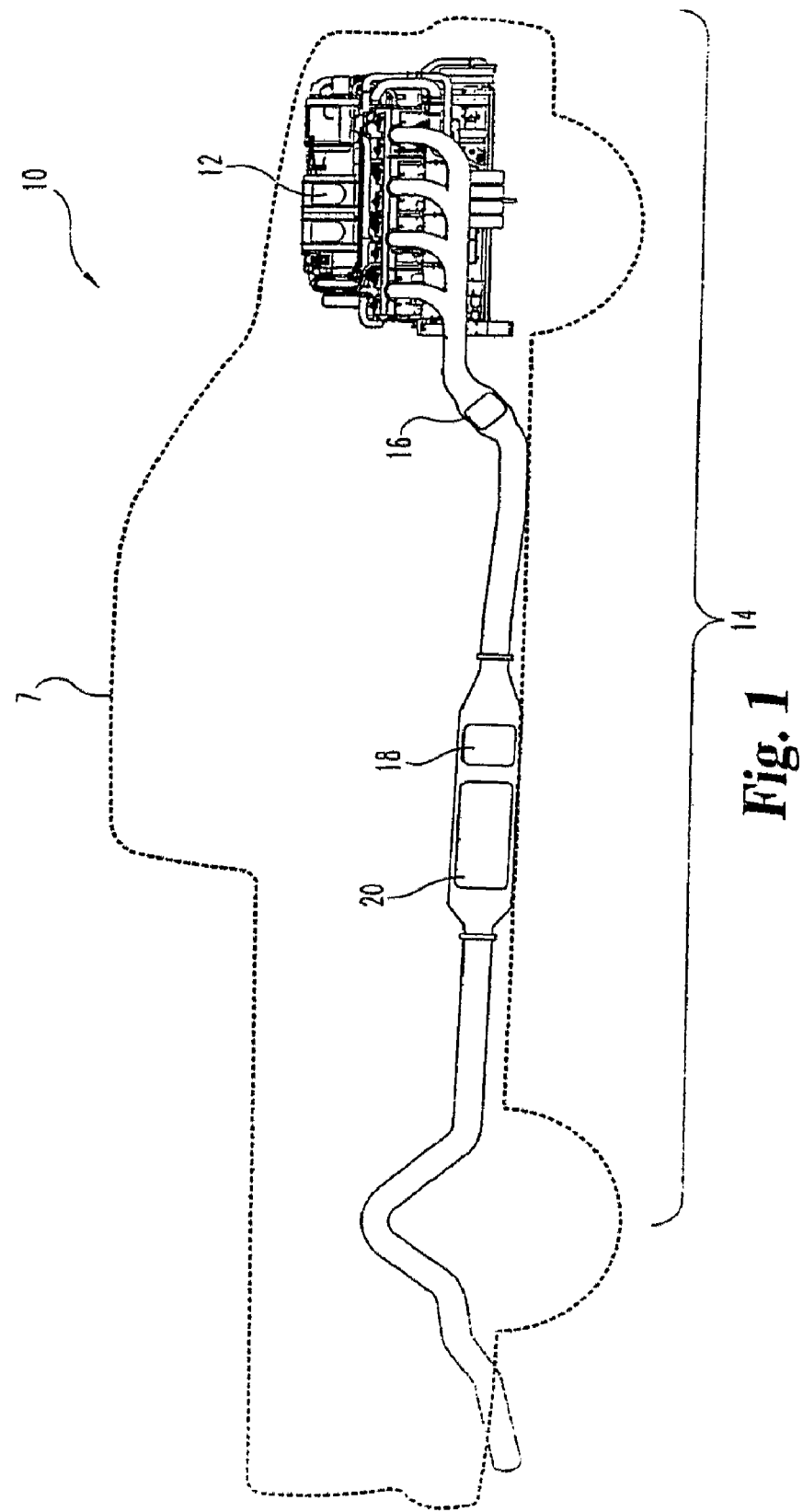
FIG. 1 is a schematic of an integrated engine-exhaust aftertreatment system provided in a vehicle.

For the purposes of promoting an understanding of the principles of the invention, reference will now be made to the embodiments illustrated in the drawings and specific language will be used to describe the same. It will nevertheless be understood that no limitation of the scope of the invention as thereby intended, such alterations and further modifications in the illustrated embodiments, and such further applications of the principles of the invention as illustrated therein being contemplated as would normally occur to one skilled in the art to which the invention relates.

With reference to FIG. 1, there is illustrated a schematic of a preferred integrated engine-exhaust aftertreatment system 10 provided in a vehicle 7. Aftertreatment subsystem 14 includes a diesel oxidation catalyst 16 which is preferably a close coupled catalyst but could be other types of catalyst units such as a semi-close coupled catalyst, a NOx adsorber or lean NOx trap 18, and a diesel particulate filter 20 which are coupled in flow series to receive and treat exhaust output from engine 12.

Diesel oxidation catalyst unit 16 is preferably a flow through device that includes a honey-comb like substrate. The substrate has a surface area that includes a catalyst. As exhaust gas from the engine 12 traverses the catalyst, CO, gaseous HC and liquid HC (unburned fuel and oil) are oxidized. As a result, these pollutants are converted to carbon dioxide and water. During operation, the diesel oxidation catalyst unit 16 is heated to a desired temperature.

NOx adsorber 18 is operable to adsorb NOx and SOx emitted from engine 12 to reduce their emission into the atmosphere. NOx adsorber 18 preferably includes catalyst sites which catalyze oxidation reactions and storage sites which store compounds. After NOx adsorber 18 reaches a certain storage capacity it is regenerated through deNOx and/or deSOx processes. Other embodiments contemplate use of different NOx aftertreatment devices, for example, a converter such as a saline NOx catalyst.

Diesel particulate filter or soot filter 20 is preferably a catalyzed soot filter, but may include one or more of several types of filters. Diesel particulate filter 20 is utilized to capture unwanted diesel particulate matter from the flow of exhaust gas exiting engine 12. Diesel particulate matter includes sub-micron size particles found in diesel exhaust, including both solid and liquid particles, and may be classified into several fractions including: inorganic carbon (soot), organic fraction (sometimes referred to as SOF or VOF), and sulfate fraction (sometimes referred to as hydrated sulfuric acid). The regeneration of diesel particulate filter 20 is referred to as desoot or soot filter regeneration and may include oxidation of some or all of the trapped fractions of diesel particulate matter. Diesel particulate filter 20 preferably includes at least one catalyst to catalyze the oxidation of trapped particulate.

Figure 2:
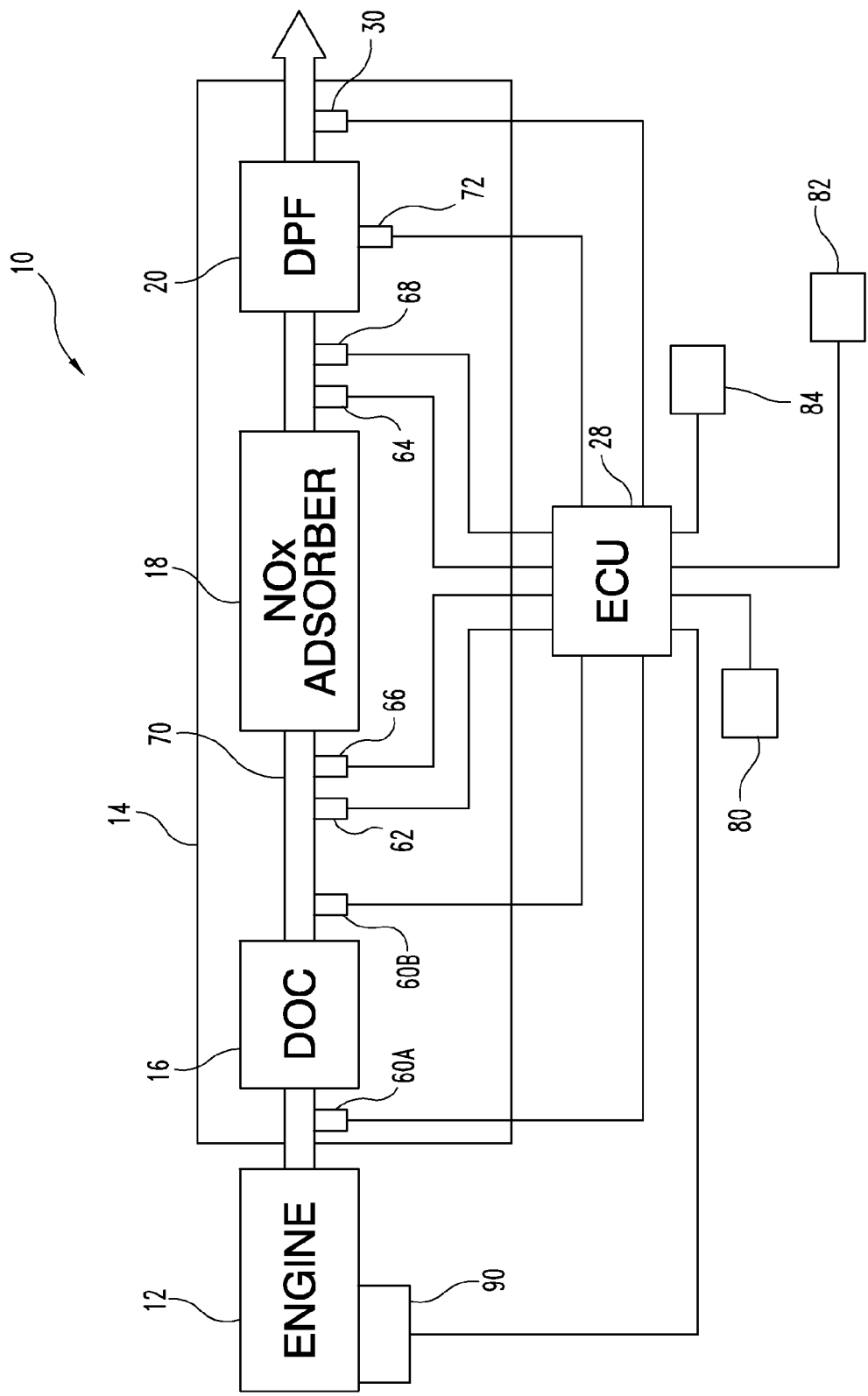
FIG. 2 is a schematic of an integrated engine-exhaust aftertreatment system operatively coupled with an engine control unit.

With reference to FIG. 2, there is illustrated a schematic of integrated engine-exhaust aftertreatment system 10 operatively coupled with an engine control unit ("ECU") 28. At least one temperature sensor 60 is connected with diesel oxidation catalyst unit 16 for measuring the temperature of the exhaust gas as it enters diesel oxidation catalyst unit 16. In other embodiments, two temperature sensors 60 are used, one at the entrance or upstream from diesel oxidation catalyst unit 16, and another at the exit or downstream from diesel oxidation catalyst unit 16. Information from temperature sensor(s) 60 is provided to ECU 28 and used to calculate the temperature of diesel oxidation catalyst unit 16.

A first NOx temperature sensor 62 senses the temperature of flow entering or upstream of NOx adsorber 18 and provides a signal to ECU 28. A second NOx temperature sensor 64 senses the temperature of flow exiting or downstream of NOx adsorber 18 and provides a signal to ECU 28. NOx temperature sensors 62 and 64 are used to monitor the temperature of the flow of gas entering and exiting NOx adsorber 18 and provide signals that are indicative of the temperature of the flow of exhaust gas to ECU 28. An algorithm may then be used by ECU 28 to determine the operating temperature of the NOx adsorber 18.

A first oxygen sensor 66 is positioned in fluid communication with the flow of exhaust gas entering or upstream from NOx adsorber 18 and a second oxygen sensor 68 is positioned in fluid communication with the flow of exhaust gas exiting or downstream of NOx adsorber 18. Oxygen sensors are preferably universal exhaust gas oxygen sensors or lambda sensors, but could be any type of oxygen sensor. Oxygen sensors 66 and 68 are connected with ECU 28 and generate electric signals that are indicative of the amount of oxygen contained in the flow of exhaust gas. Oxygen sensors 66 and 68 allow ECU 28 to accurately monitor air-fuel ratios ("AFR") also over a wide range thereby allowing ECU 28 to determine a lambda value associated with the exhaust gas entering and exiting NOx adsorber 18.

Engine 12 includes a fuel injection system 90 that is operatively coupled to, and controlled by, ECU 28. Fuel injection system 90 delivers fuel into the cylinders of engine 12. Various types of fuel injection systems may be utilized in the present invention, including, but not limited to, pump-line-nozzle injection systems, unit injector and unit pump systems, common rail fuel injection systems and others. The timing of the fuel injection, the amount of fuel injected, the number and timing of injection pulses, are preferably controlled by fuel injection system 90 and/or ECU 28.

Sensor 72 is a pressure differential sensor arrangement which is operable to sense a pressure differential, preferably a pressure differential across diesel particulate filter 20, and provide pressure differential information to ECU 28. Sensor 74 is a temperature sensor arrangement which is operable to sense a temperature of diesel particulate filter 20 and provide temperature information to ECU 28. ECU 28 can also receive temperature information from bed model virtual sensor 80. ECU 28 can receive ambient pressure information from sensor 80. ECU 28 can receive information about fuel flow rate from fuel flow rate sensor 82 which can be a physical or virtual sensor. ECU 28 can receive information about fresh air flow rate from fresh air flow sensor 84, which can be a mass flow rate sensor which is operatively coupled with a fresh air flow passage or a virtual sensor. In certain embodiments, some or all of the foregoing sensors are virtual sensors. In other embodiments some or all of the foregoing sensors are physical sensors. In further embodiments, a combination of virtual and physical sensors is used.

The soot load of a diesel particulate filter or soot-filter such as diesel particulate filter 20 can be correlated to the pressure drop across the soot filter divided by the volumetric flow through the filter $\nabla P/Q$. This metric for soot loading applies if the pressure loss characteristics correspond to that of flow through a permeable media where the soot layer and filter porosity can be envisioned as being made up of a series of capillary tubes. Under such conditions $\nabla P/Q$ can be determined or calculated according to Equation 1:

$$\frac{\nabla P}{Q} = \mu \frac{2L\varepsilon}{AR_h^2} \quad \text{(Equation 1)}$$

where
$\nabla P$=soot filter differential pressure
$Q$=volumetric flow
$\mu$=absolute viscosity
$A$=cross-sectional area of filter
$\varepsilon$=void fraction or porosity
$R_h$=hydraulic radius of passage
$L$=length of passage The geometric parameters void fraction, passage radius and length, can be combined with viscosity if it is assumed constant, into a single value that is a function of the soot load as described by Equation 2:

$$\frac{\nabla P}{Q} = K_s' \quad \text{(Equation 2)}$$

where $K_s'$ is a value that correlates to the soot load.

Using $\nabla P/Q$ as a soot-loading metric assumes that pressure loss between pressure taps is entirely from laminar wall friction, viscosity is constant, flow is adiabatic (no heat transfer or heat source), and density is constant.

Preferred embodiments include methods, systems, and software which include an improved soot loading metric. In a preferred embodiment, the improved metric can include the effects of the turbulent pressure loss mechanism and fluid viscosity. The relationship between the soot-filter pressure loss coefficient, $C_L$, to Reynolds number, Re, may be experimentally determined. The loss coefficient and Reynolds number are defined according to Equation 3 and Equation 4, respectively;

$$C_L = \frac{\nabla P}{\frac{1}{2}\rho V^2} \quad \text{(Equation 3)}$$

$$Re = \frac{V\rho D}{\mu} \quad \text{(Equation 4)}$$

where,
V=Average velocity in reference cross-section
ρ=Fluid density
D=Diameter of reference cross-section For many flow paths the power-law relationship given by Equation 5 applies:

$$C_L = \frac{C}{Re^b}, \quad \text{(Equation 5)}$$

where C and b are constants.

The constant b will equal one if the pressure loss is entirely from laminar wall friction and zero if the pressure loss is entirely from turbulence. This value of the constant b can be determined experimentally.

Figure 3:
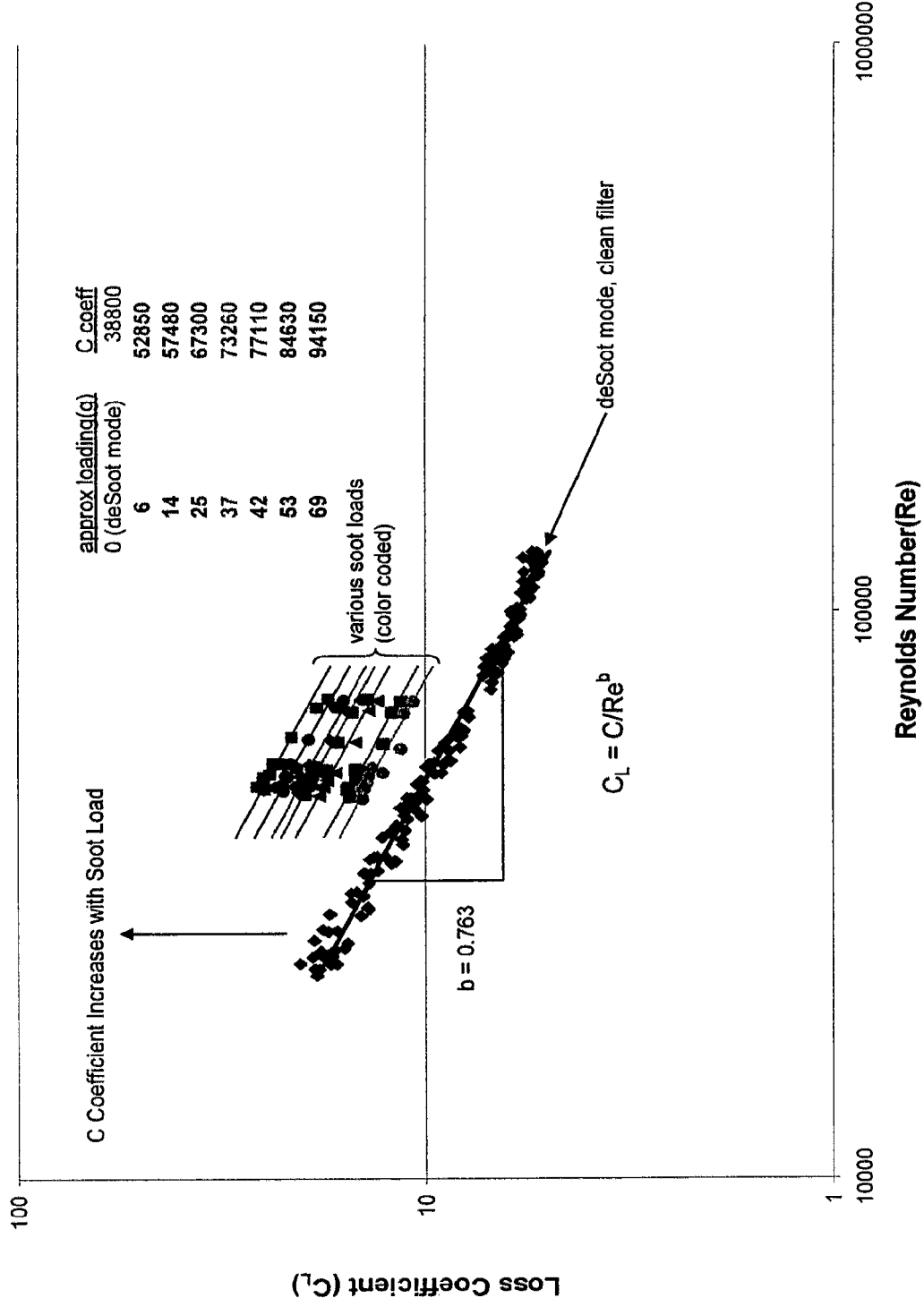
FIG. 3 is a graph of loss coefficient versus Reynolds number.

With reference to FIG. 3, there is illustrated a graph of loss coefficient as a function of Reynolds number showing the loss characteristics of a soot filter. A full engine map was run in regeneration mode on a clean filter. The data of this map are the points which fit the line indicated with the arrow and label "deSoot mode, clean filter." From this line, the value of the exponent coefficient b was empirically determined to be 0.763. Less extensive maps, the smaller data sets of FIG. 3, were run with soot loaded filters which were loaded with various soot loads. This shortened the run time and prevented the soot load from changing significantly during the map run time. The data of from these maps are the points which fit the group of lines indicates with the bracket and label "various soot loads (color coded)". These groups gave greater accuracy of the metric when the exemplary filter was clean.

The inventors determined that the pressure loss follows the power law equation. The exponent coefficient b is 0.763 which indicates that the primary pressure loss is by laminar wall friction, but there is also a significant turbulence pressure loss mechanism. The b exponent was established using the clean filter data. For each loaded condition data set, the C factor was fit using least squares and assuming the b coefficient from the regeneration data applied.

As shown in FIG. 3, the coefficient C can be used to estimate the soot loading state of the filter. In a preferred embodiment, the improved soot-loading metric can be determined as follows. Solve for C in Equation 5 as se forth in Equation 6:

$$C = C_L Re^b \quad \text{(Equation 6)}$$

Substitute the definitions of the loss coefficient, Equation 3, and Reynolds number, Equation 4, to arrive at Equation 7:

$$C = \frac{\nabla P}{\frac{1}{2}\rho V^2} \frac{V^b \rho^b D^b}{\mu^b} = \frac{\nabla P D^b}{\frac{1}{2}\rho^{1-b} V^{2-b} \mu^b}. \quad \text{(Equation 7)}$$

From the continuity equation, Equation 8 follows:

$$V = \frac{\dot{m}}{\rho A}, \quad \text{(Equation 8)}$$

where
$\dot{m}$—Mass flow rate
A—Cross-section of reference diameter.
Substitute Equation 8 into 7 yields Equation 9:

$$C = 2D^b A^{2-b} \frac{\nabla P \rho}{\dot{m}^{2-b} \mu^b} \quad \text{(Equation 9)}$$

Density can be computed from the gas temperature and pressure using the ideal gas law as set forth in Equation 10:

$$\rho = \frac{P_s}{RT}, \quad \text{(Equation 10)}$$

where,
$P_s$—Static pressure at reference cross-section of a filter
T—Temperature at reference cross-section of a filter
R—Ideal gas constant
Substituting Equation 10 into Equation 9 yields Equation 11:

$$C = \frac{2D^b A^{2-b}}{R} \frac{\nabla P P_s}{\dot{m}^{2-b} T \mu^b} \quad \text{(Equation 11)}$$

Figure 4:
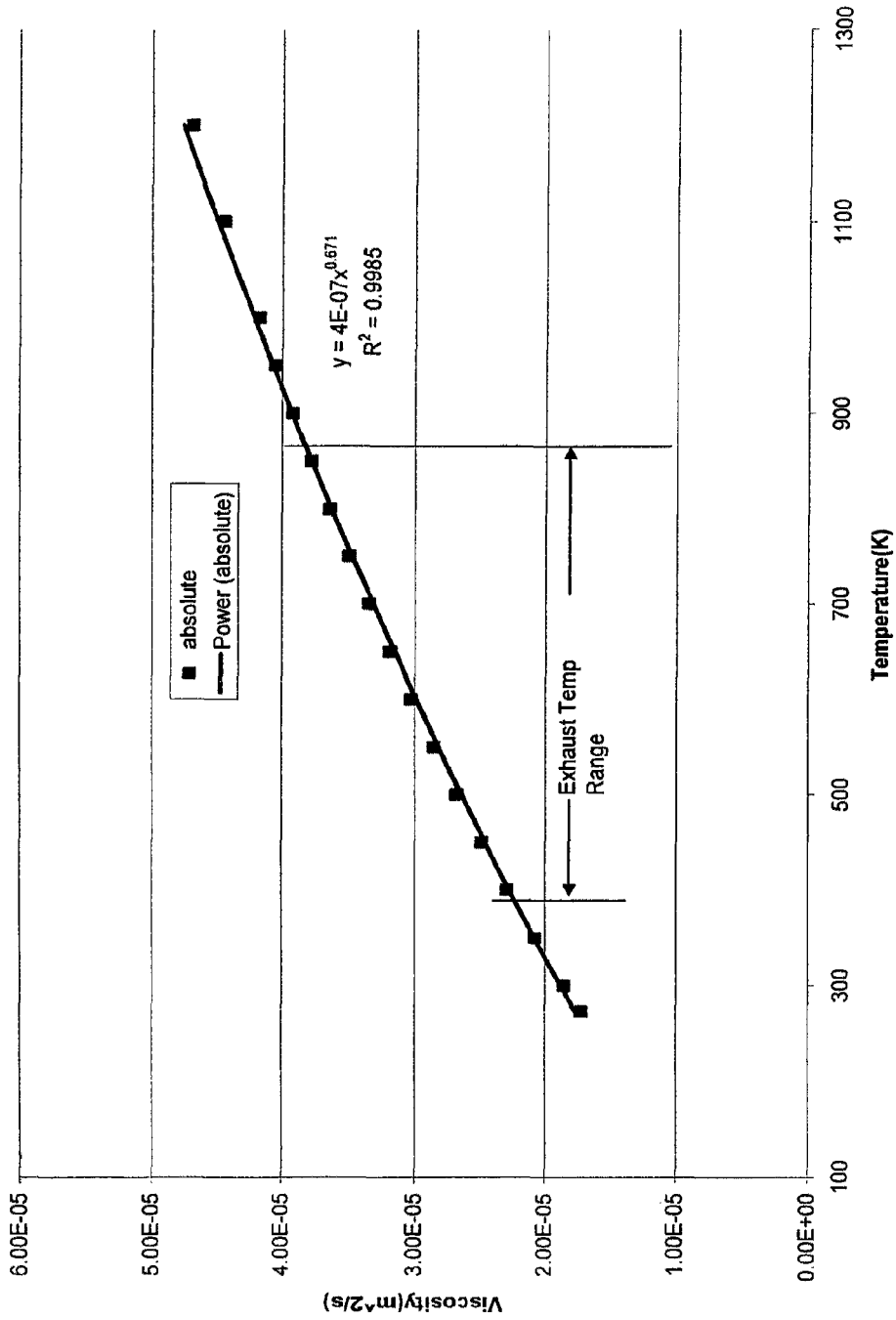
FIG. 4 is a graph of viscosity versus temperature.

For an ideal gas, viscosity is a function of temperature alone. FIG. 4 shows the viscosity of air as a function of temperature. Note that viscosity can change by almost a factor of 2 over the temperature range of diesel exhaust and can be accounted for. Equation 12 relates a burnt air/fuel mixture to that of air:

$$\mu_{prod} = \frac{\mu_{air}}{1 + 0.027\phi}, \quad \text{(Equation 12)}$$

where $\phi$ is the equivalence ratio. Diesel engines run at equivalence ratios less than 1, so the exhaust gas viscosity will not differ from that of air by more that 2.7%. This difference can be neglected in the improved soot-load metric.

FIG. 4 shows that the viscosity is related to temperature by the power law given by Equation 13:

$$\mu = \mu_{ref} \left(\frac{T}{T_{ref}}\right)^{0.67} \quad \text{(Equation 13)}$$

Finally, substituting Equation 13 into Equation 11 yields the final form for the C coefficient given by Equation 14:

$$C = \frac{2D^b A^{2-b}}{R \mu_{ref}^b T_{ref}} \frac{\nabla P P_s}{\dot{m}^{2-b} \left(\frac{T}{T_{ref}}\right)^{0.67b+1}} \quad \text{(Equation 14)}$$

To arrive at the improved soot load metric, M, the first fractional term in Equation 14 can be omitted since it is a constant and has no effect on changes due to soot load. The improved soot load metric is thus defined according to Equation 15:

$$M = \frac{\nabla P P_s}{\dot{m}^{2-b} \left(\frac{T}{T_{ref}}\right)^{0.67b+1}} \quad \text{(Equation 15)}$$

Table 1 below shows the units for the inputs and engine sensors according to a preferred embodiment.

TABLE 1

| Parameter | Units | Sensor | Calculation |
|---|---|---|---|
| $\nabla P$ | in-Hg | Filter Differential Pressure | NA |
| $P_s$ | in-Hg | Barometric Pressure and Filter Differential Pressure | $= P_{bar} + \nabla P/2$ |
| $\dot{m}$ | lbm/min | Fresh Air Flow Sensor and Fuel Flow Rate Virtual Sensor | $= \dot{m}_{air} + \dot{m}_{fuel}$ |
| T | K | Bed Model Virtual Sensor | NA |
| $T_{ref}$ | K | Not Applicable | = 300K |

The sensors listed in Table 1 can be the sensors described above in connection with FIG. 2, for example, or other sensors operable to provide appropriate information. The calculations to solve equation 15 for M can be performed by ECU 28 described above in connection with FIG. 2, for example, or can be performed by another controller, processor, or other device. In order to better approximate the gas properties in the soot filter, the average of the inlet and outlet pressure (assuming negligible exhaust system losses downstream of filter) and bed temperature estimate can be used.

The improved metric has been validated using a test cell. Several test-cell data sets have been taken to gain confidence in using the improved metric as a soot-load predictor in both base-engine run mode and in regeneration mode.

Soot-Load Metric Behavior with Soot Load Mass

Figure 5:
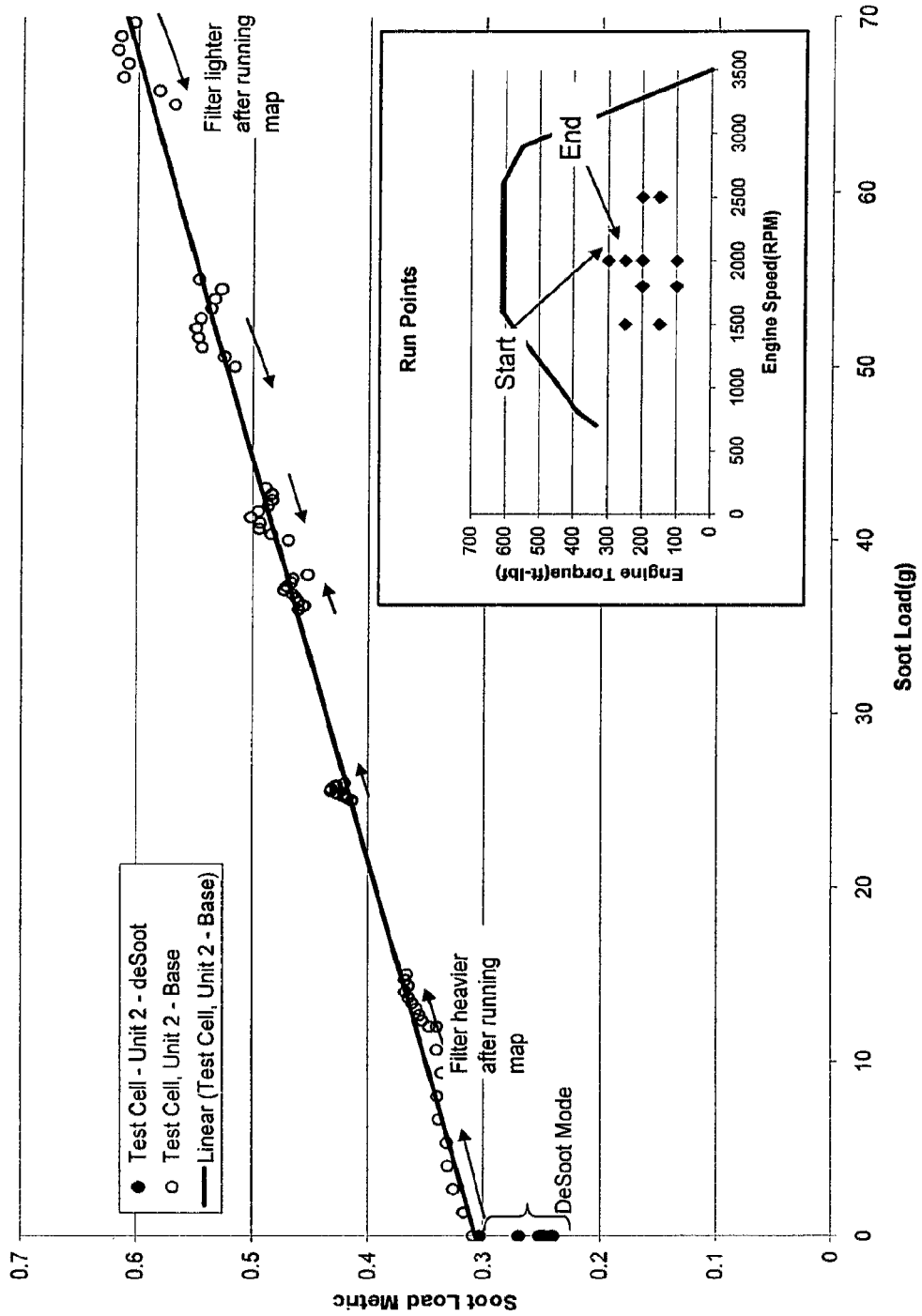
FIG. 5 is a graph of soot load metric versus soot load.

FIG. 5 shows an exemplary improved soot loading metric as a function of soot-load mass. The metric varies linearly from approximately 0.3 clean to approximately 0.55 fully loaded at 55 grams. Each data group was collected at the run modes shown in the smaller plot. For each data group the soot loading mass was measured at the beginning and end of the map. The soot mass of the intermediate points was assumed to vary linearly from the beginning of the map to the end. The arrows indicate whether the soot load increased or decreased from beginning to end. Note that at high soot loadings the soot load decreased whereas the soot load increased when the map was started at a low soot load. The engine torque was limited for this map to keep the temperature low enough to prevent cleaning the filter before the map completed. This plot shows a highly linear correlation of the soot load to an exemplary improved metric.

Figure 6:
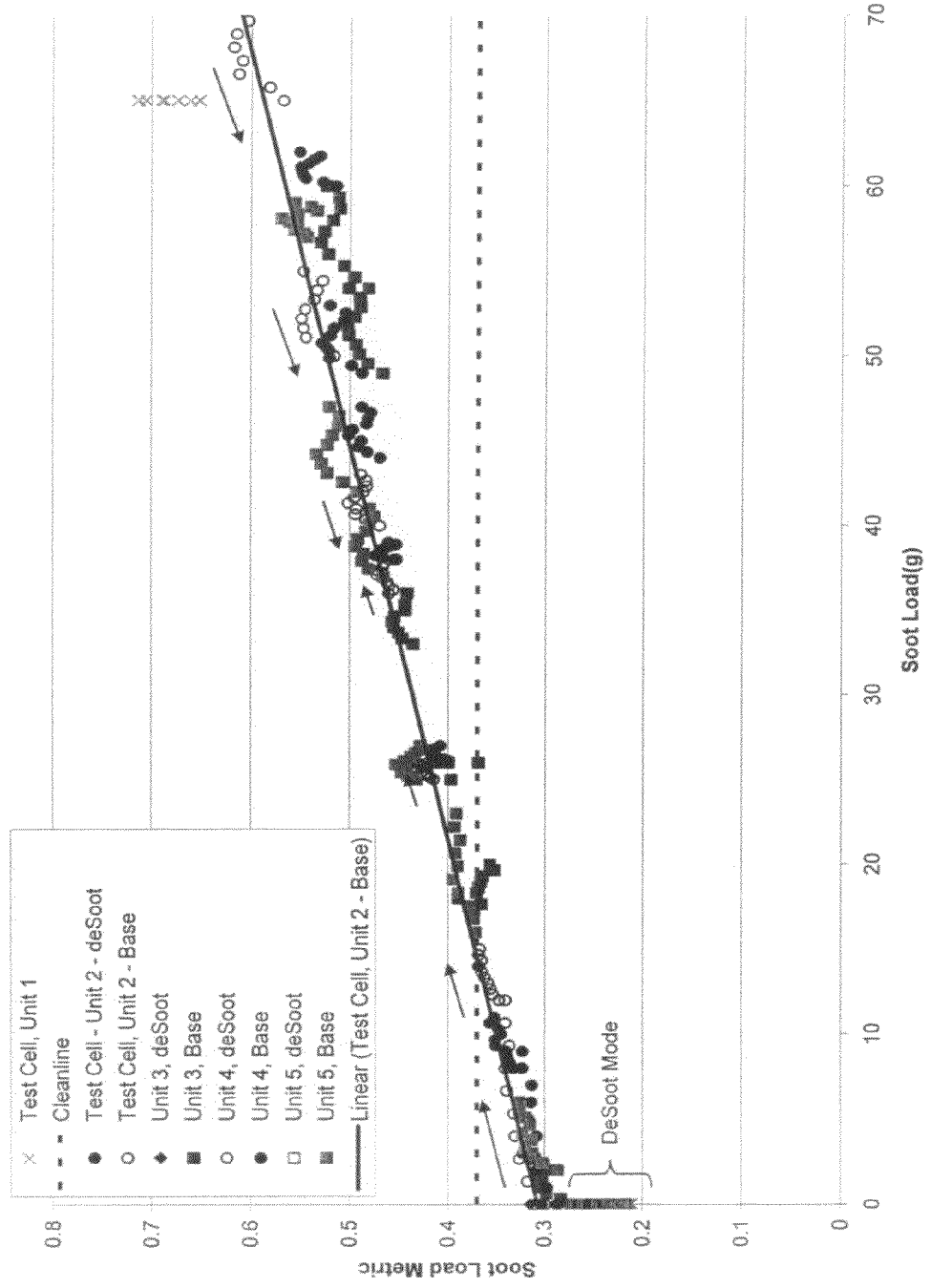
FIG. 6 is a graph of soot load metric versus soot load.

FIG. 6 shows similar data as FIG. 5 collected on four additional particulate filter units to indicate the part-to-part variability of the metric value to soot load. The part-to-part variability is much smaller than the change due to the soot load.

Clean Filter Metric Variation

Figure 7:
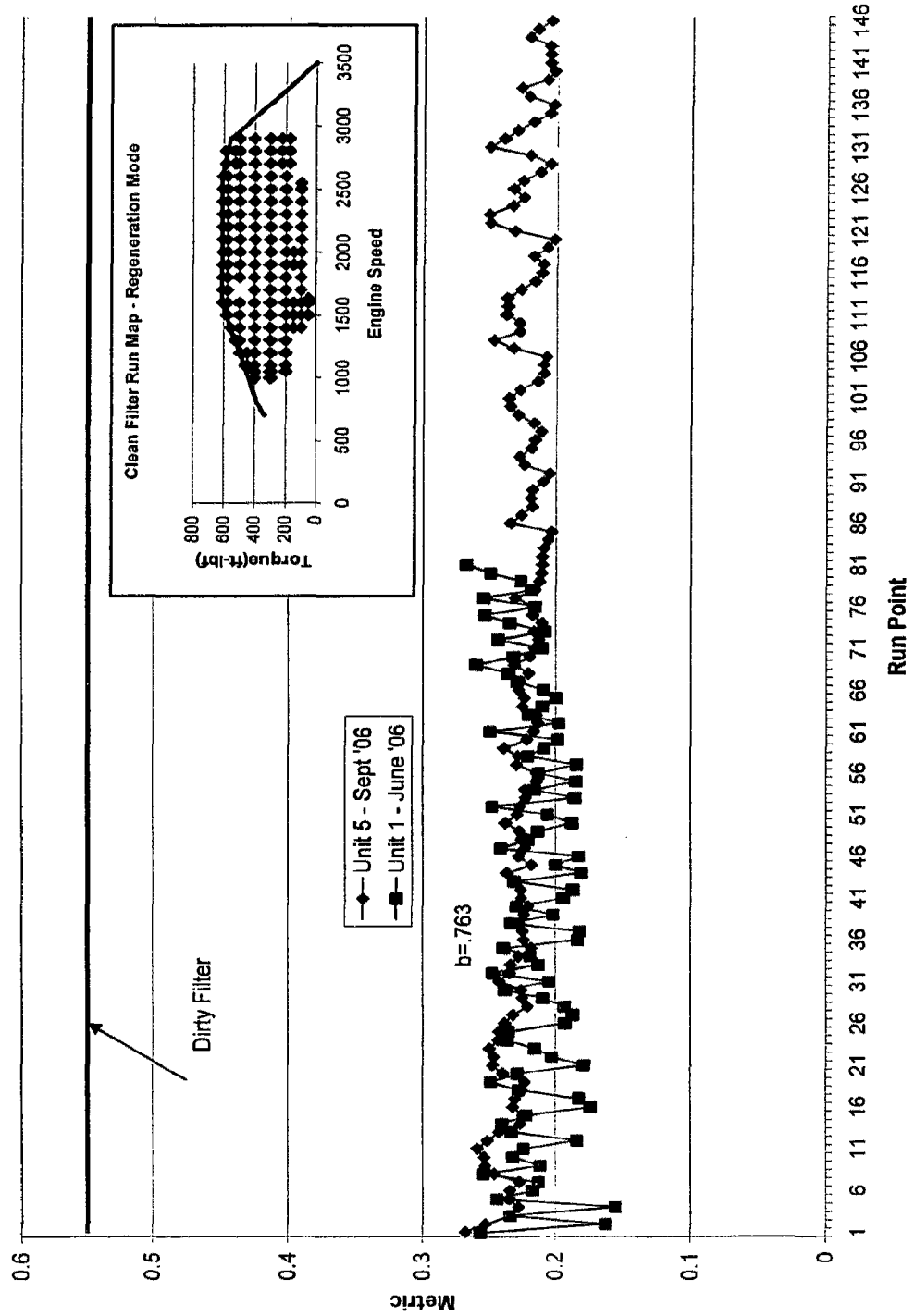
FIG. 7 is a graph of soot load metric versus run point.

FIG. 7 shows an exemplary metric values of a clean filter in regeneration mode. The engine run map extensively covers the engine operating range as shown in small inserted plot. The exemplary metric variation over this map is small compared to the range of the metric value corresponding to a clean and dirty filter. A number of comparisons of the improved metric and the ∇P/Q Metric were conducted.

Loaded Filter Metric Comparison

Figure 8:
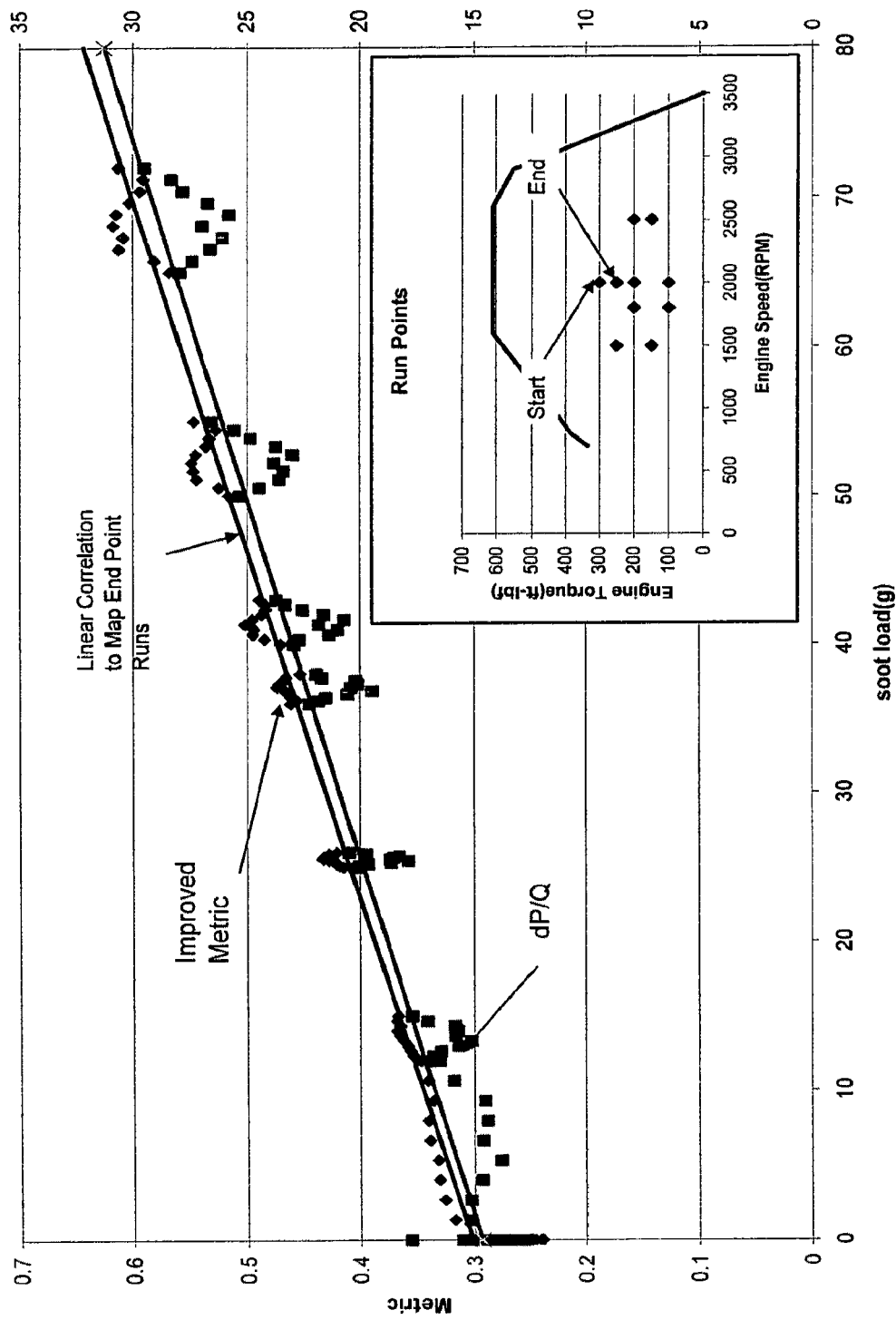
FIG. 8 is a graph of soot load metric versus soot load.

FIG. 8 shows the correlation of an exemplary improved-metric to soot-load compared to the correlation of a ∇P/Q metric to soot load. The same measurement data were used to calculate both metrics. A correlation line has been fit through each of the run map end points since these are the points where the soot mass was actually measured. For the intermediate points the soot load was assumed to follow a linear line from the starting mass to the ending mass. Note that the ∇P/Q intermediate points fall further away from this correlation line than do the improved-metric points.

Figure 9:
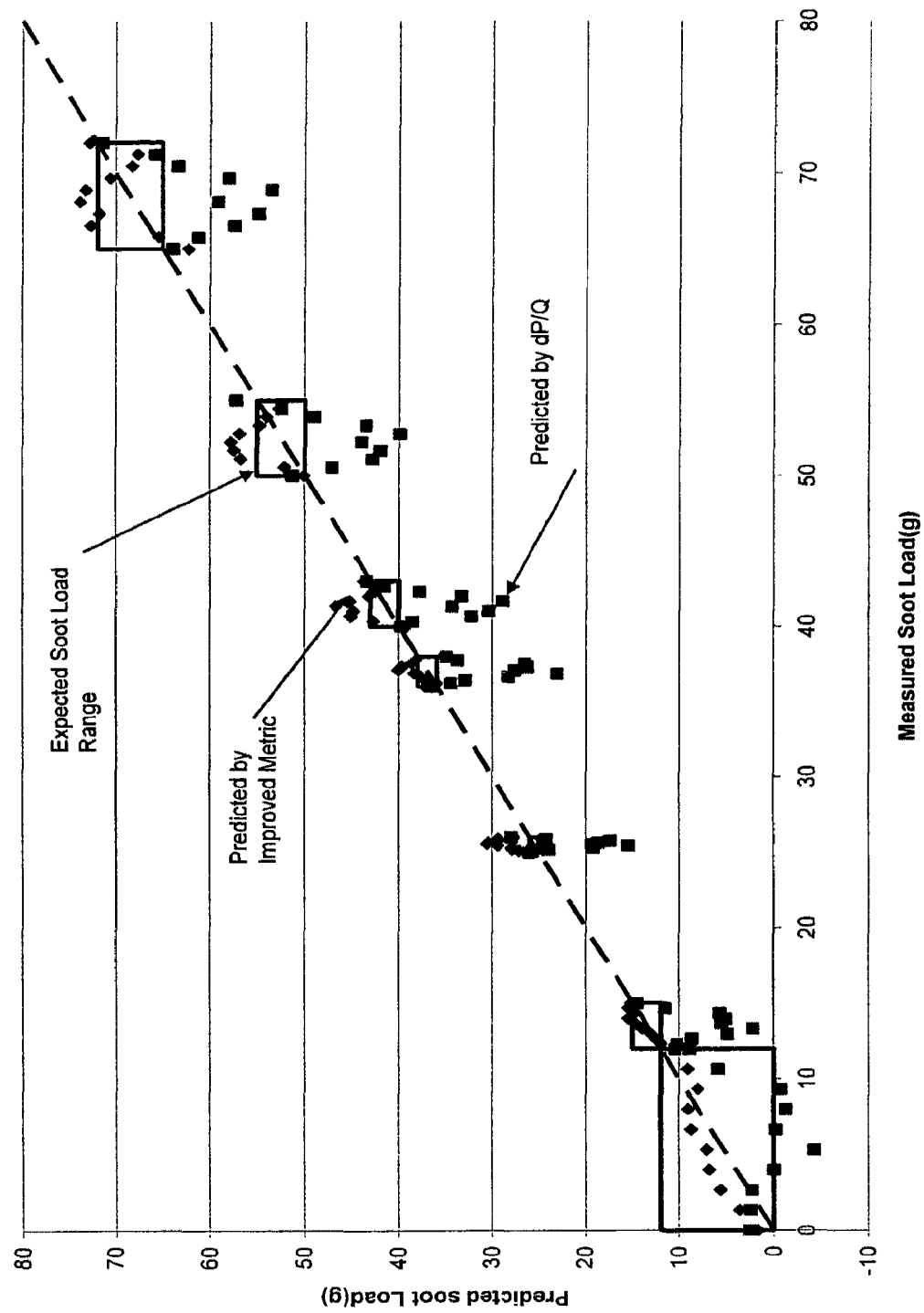
FIG. 9 is a graph of predicted soot load versus measured soot load.

Using the correlation line of FIG. 8, the intermediate point soot load can be predicted for each metric value. FIG. 9 shows these results. It is expected that predicted soot load should fall between the starting and ending soot load values. The boxes in FIG. 9 show the expected soot load prediction ranges. The ∇P/Q points fall much further outside the expected range than the improved-metric predictions. These results indicate that the ∇P/Q metric is more affected by the change in flow field properties than is an exemplary improved metric.

Clean Filter Metric Comparison

Figure 10:
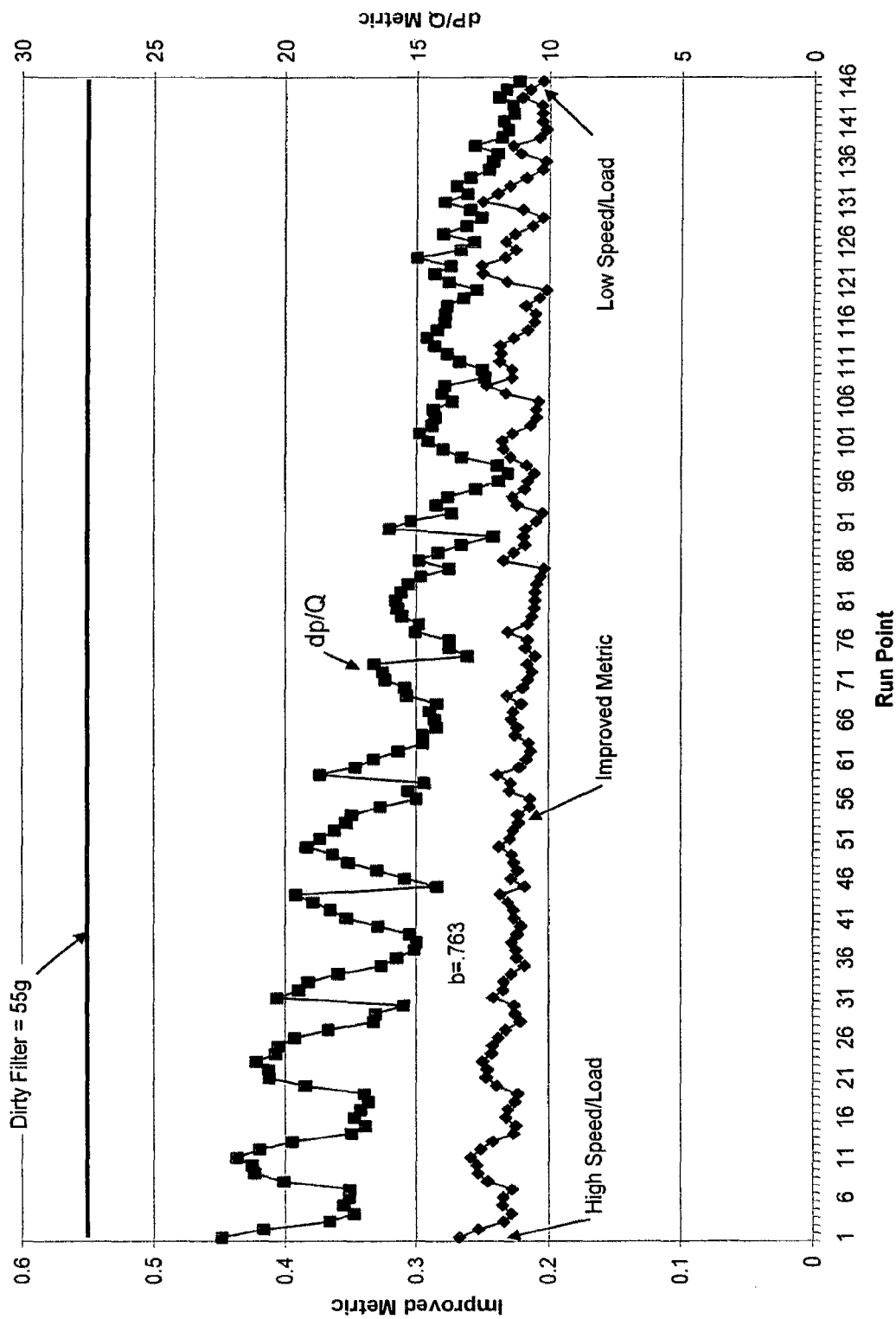
FIG. 10 is a graph of soot load metric versus run point.

FIG. 10 presents an exemplary improved metric and the ∇P/Q metric during a regeneration event on a clean filter for a map that covers an entire engine operating region (see FIG. 7 for run modes). The ∇P/Q metric value changes extensively over this map due to the changing flow field properties associated with different run modes. The change in the improved metric is much smaller when compared to the range in metric value from a clean to dirty filter. Therefore the improved metric is capable of detecting a clean filter. Conversely, there would be a great deal of inaccuracy using dP/Q to determine soot loading if a filter was clean.

Behavior of Metrics During a Regeneration Event

Figure 11:
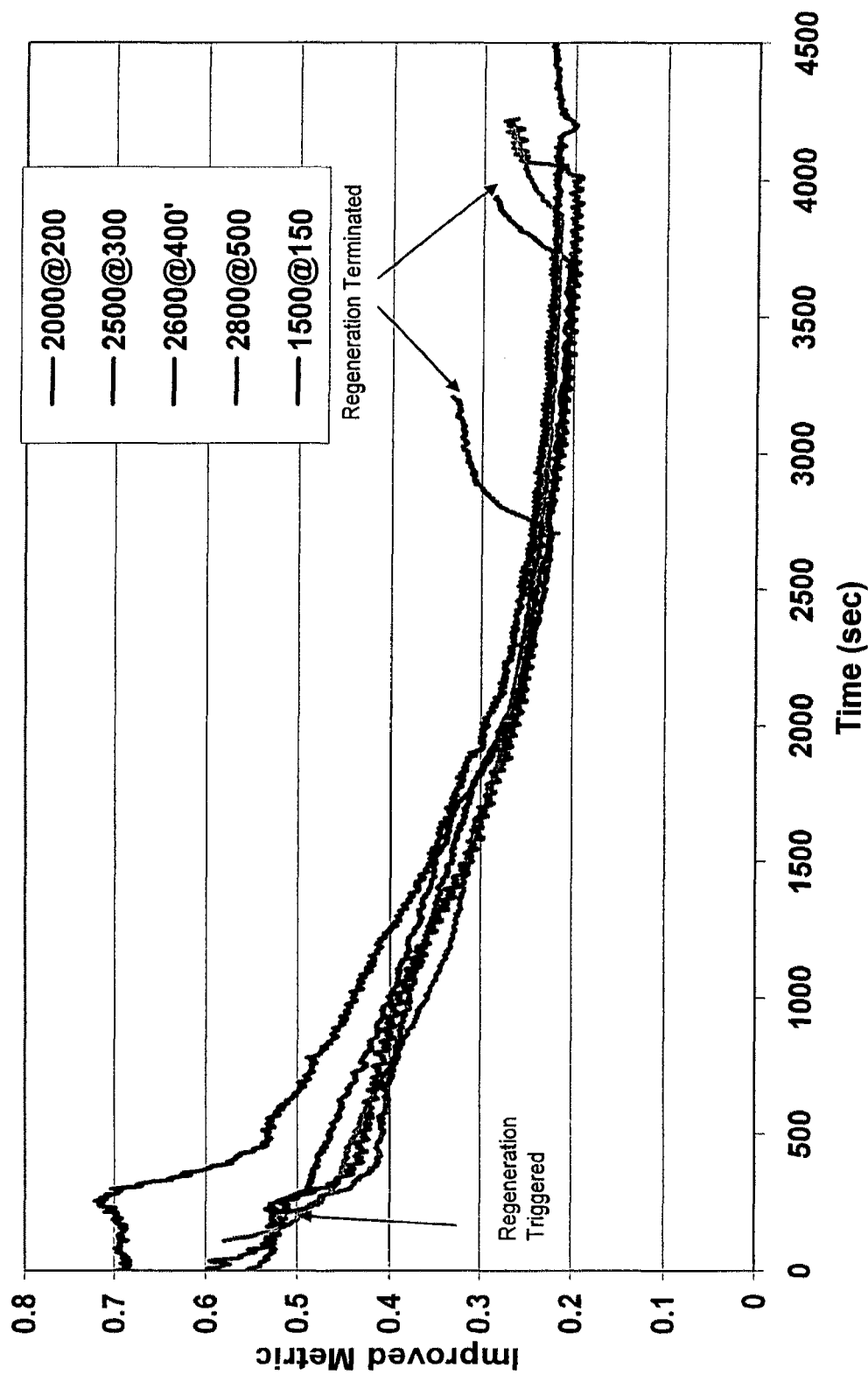
FIG. 11 is a graph of soot load metric versus time.

FIG. 11 shows time traces of an exemplary improved metric during a regeneration event for five different run modes. The filters were loaded to 60 grams. The engine was run briefly in base run mode and then regeneration was triggered. Note that the beginning metric value was the same for all the run modes except for the 1500@150 mode. For the 1500@150 test, the filter was loaded one day, the engine sat overnight, and then the test was conducted. For all the other tests the filter was loaded and the test was run immediately after. The difference in metric value could be due to changes in the soot consistency as it sat overnight. All of the traces collapse to the same metric value as the regeneration event nears completion. A jump in the traces occurs in the metric value near the end of regeneration. The cause could be due to: change from heat source, dosing, to no heat source, change in physical dimensions of the filter flow paths as the temperature of the gas and filter element decreases, filling of the filter pores with soot.

Figure 12:
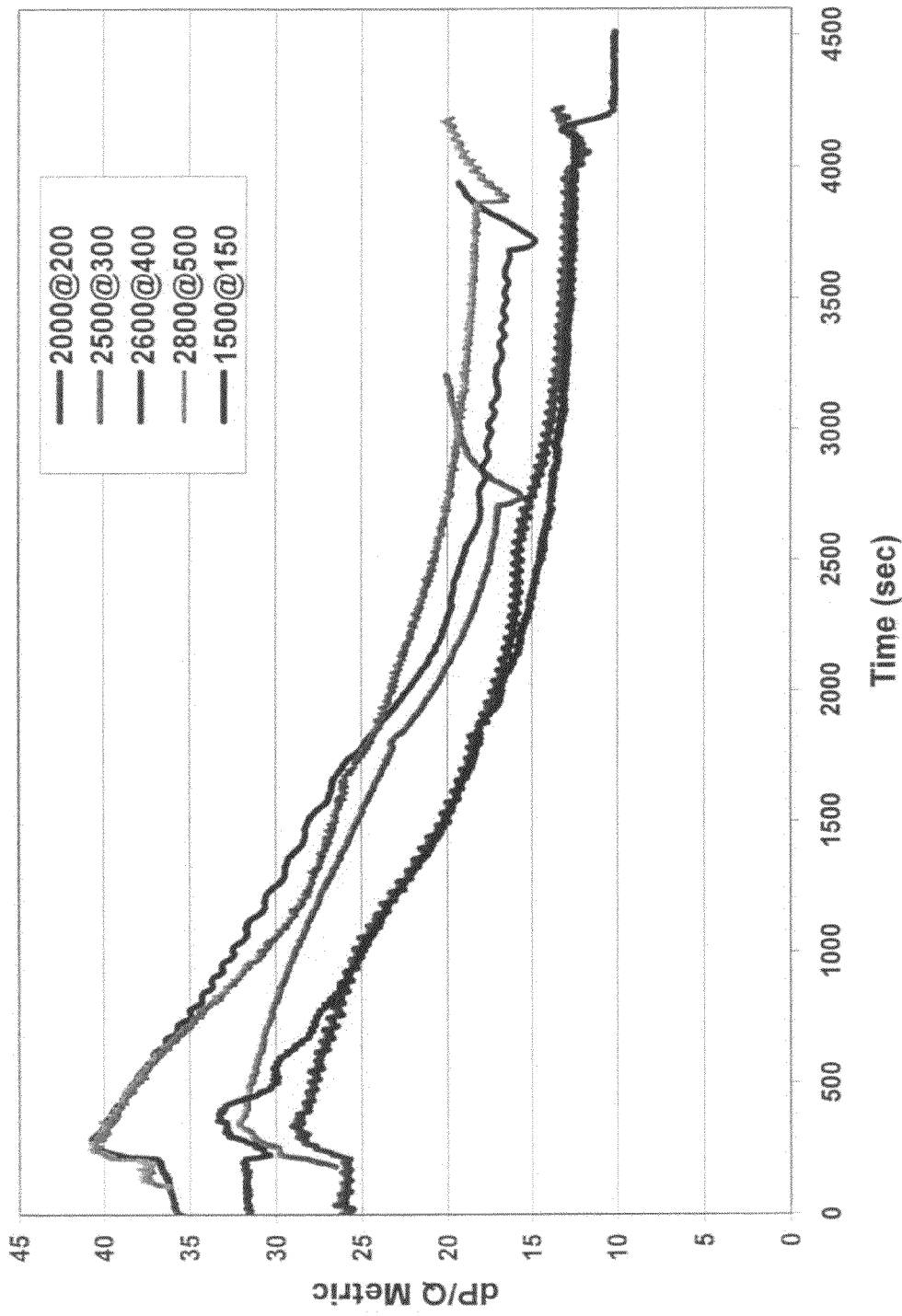
FIG. 12 is a graph of soot load metric versus time.

FIG. 12 shows the ∇P/Q metric calculated from the same test data as FIG. 11. The starting metric values are more varied, and the traces do not collapse near the end of the regeneration event, another indication that the ∇P/Q metric is affected more by the flow field parameter change with run mode.

City Stop-and-Go Cycle Behavior of Improved Metric

Figure 13:
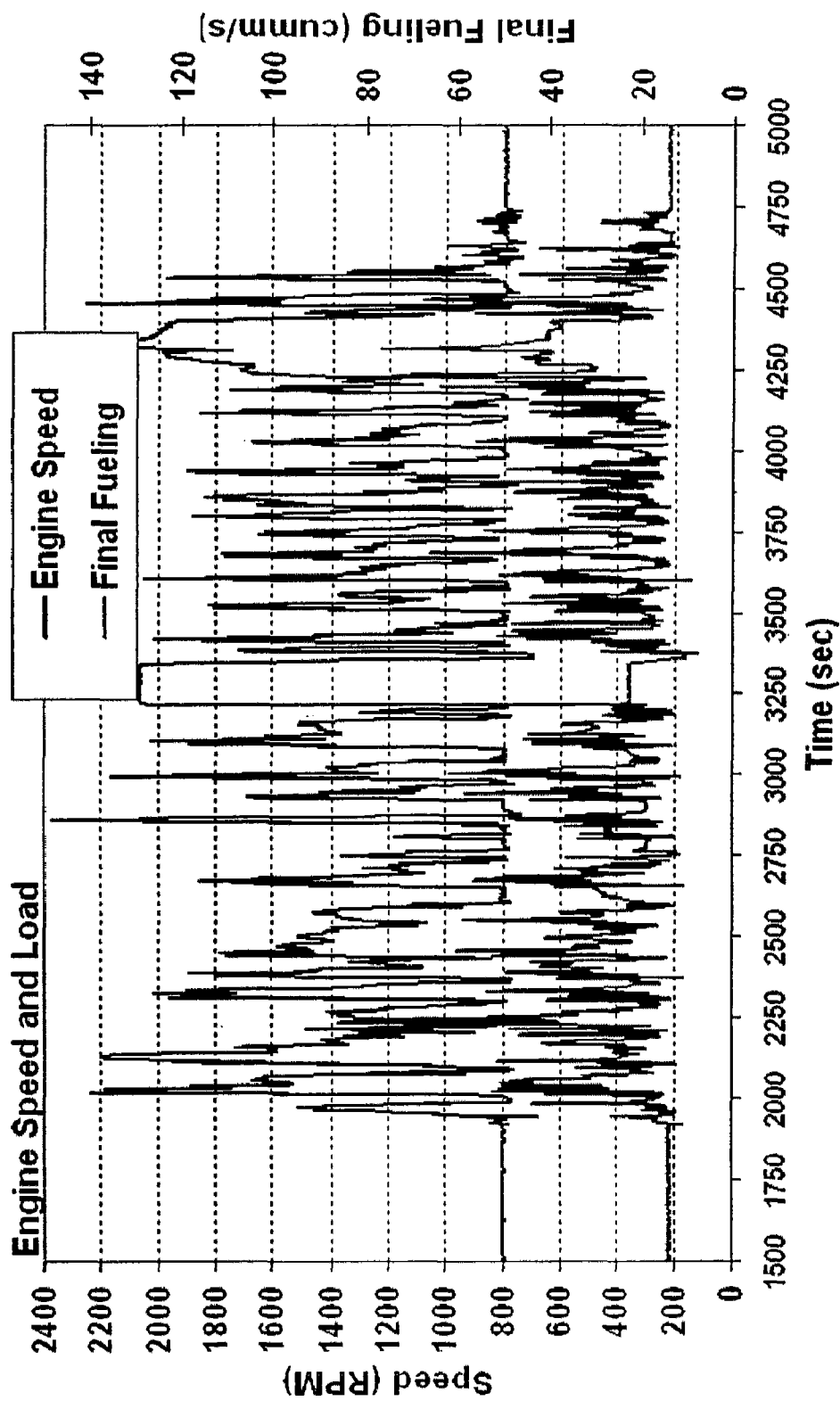
FIG. 13 is a graph of engine speed and final fueling versus time.

FIG. 13 presents the speed and torque time traces of a test cell simulated engine stop-and-go route. FIG. 14 presents an exemplary improved metric value for this route. The blue points indicate a believable metric value, where the volumetric flow rate is above the threshold of 0.15 m$^3$/sec. The exemplary improved metric responds accurately over the rapid changing speed and load. The metric value monotonically increases during the portion of the cycle outside of regeneration and decreases monotonically during the regeneration mode.

Various embodiments contemplated use of the improved metric to initiate, request and/or command desoot operations both alone or in combination with other metrics. Certain embodiments contemplate use of the improved metric to initiate regeneration based upon an experimentally determine the minimum metric value that corresponds to a fully-loaded mal-distributed filter. Various embodiments contemplate use of the improved metric and an algorithm that corrects for zero drift when the engine is off. Certain preferred embodiments contemplate commanding, initiating, or requesting, a soot filter regeneration event can be initiated when the metric is above a threshold. Certain preferred embodiments contemplate command an end to or terminating a desoot or regeneration event when the metric is below a threshold. Certain preferred embodiments contemplate commanding, initiating, or requesting, a soot filter regeneration event can be initiated when the metric is above a threshold and terminated when the metric is below a threshold. Another preferred embodiment contemplates using a soot pressure differential, an exhaust flow rate, and exhaust flow temperature and pressure, to determine or calculate the value of a metric to provides a an indication of actual soot load in the filter. Additional embodiments contemplate using that metric value can then be to initiate and/or terminate a regeneration event and/or to prevent overloading the soot filter and/or to save fuel used for regeneration.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. While equations, theory, and experimental results and validations have been presented to aid in an understanding of the principles of the invention they are not to be considered restrictive unless provided to the contrary.

What is claimed is:

1. A method comprising:
    treating exhaust with a soot filter;
    sensing information including a pressure differential of the soot filter, a temperature of the soot filter, an ambient pressure, an air flow, and a fuel flow;
    evaluating the information to determine a value; and
    commanding a regeneration of the soot filter based upon the evaluating;
    wherein the evaluating the information to determine the value accounts for a first contribution to the pressure differential attributable to laminar flow wall friction and accounts for a second contribution to the pressure differential attributable to turbulent flow using an empirically determined constant.

2. The method according to claim 1 further comprising:
    second sensing second information including a second pressure differential of the soot filter, a second temperature of the soot filter, a second ambient pressure, a second air flow, and a second fuel flow;
    second evaluating the second information to determine a second value; and
    second commanding an end of regeneration of a soot filter based upon the second evaluating;
    wherein the second evaluating the second information to determine the second value accounts for a first contribution to the second pressure differential attributable to laminar flow wall friction and a second contribution to the second pressure differential attributable to turbulent flow.

3. The method according to claim 1 wherein the evaluating the information to determine a value includes solving or estimating a solution to the equation:

$$M = \frac{\nabla P P_s}{\dot{m}^{2-b}\left(\frac{T}{T_{ref}}\right)^{k(b+1)}}$$

where M is the metric value, $\nabla P$ is the pressure differential of the soot filter, $P_s$ is a function of the ambient pressure, $\dot{m}$ is a function of the air flow and the fuel flow, T is a sensed temperature or a modeled temperature, $T_{ref}$ is a reference temperature, k is constant, and b is the constant which accounts for the first contribution to the pressure differential attributable to laminar flow wall friction and the second contribution to the pressure differential attributable to turbulent flow.

4. The method according to claim 3 wherein $P_s$ has a value equal to or substantially equal to the ambient pressure plus one half of $\nabla P$.

5. The method according to claim 3 wherein $\dot{m}$ has a value equal to or substantially equal to the sum of the air flow and the fuel flow.

6. The method according to claim 3 wherein k has a value equal to or substantially equal to 0.67.

7. The method according to claim 3 wherein b has a value equal to or substantially equal to 0.763.

8. The method according to claim 1 further comprising regenerating the soot filter.

9. The method according to claim 8 wherein the regenerating includes increasing a temperature of the soot filter.

10. The method according to claim 1 wherein the evaluating is performed by an engine control unit.

11. A system comprising:
    an exhaust aftertreatment subsystem including a soot filter;
    a controller operable to receive information of a pressure differential of the soot filter, a temperature of the soot filter, an ambient pressure, an air flow, and a fuel flow, to evaluate the information to produce a value, said value accounting for a laminar flow contribution to the pressure differential and a turbulent flow contribution to the pressure differential, and to command regeneration of the soot filter based upon the value; wherein the accounting for the turbulent flow contribution to the pressure differential uses an empirically determined constant.

12. The system according to claim 11 wherein the exhaust aftertreatment subsystem includes a NOx adsorber.

13. The system according to claim 11 wherein the exhaust aftertreatment subsystem includes a diesel oxidation catalyst.

14. The system according to claim 11 wherein the exhaust aftertreatment subsystem is flow coupled to receive exhaust from a diesel engine.

15. The system according to claim 14 wherein the diesel engine is operable to power a vehicle.

16. system comprising:
    a diesel particulate filter;
    a processor;
    a first sensor means for providing fuel flow information to the processor;
    a second sensor means for providing air flow information to the processor; and
    a third sensor means for providing pressure differential information to the processor;
    wherein the processor calculates a soot load of the diesel particulate filter based upon the fuel flow information, the air flow information, and the pressure differential information, and the calculation accounts for an effect of turbulence on the pressure differential information using an empirically determined constant.

17. The system according to claim 16 further comprising a fourth sensor means for providing ambient pressure information to the processor.

18. The system according to claim 17 wherein the processor calculates a soot load of the diesel particulate filter further based upon the ambient pressure information.

19. The system according to claim 16 wherein the processor calculates a soot load of the diesel particulate, M, according to the following equation:

$$M = \frac{\nabla P P_s}{\dot{m}^{2-b}\left(\frac{T}{T_{ref}}\right)^{k(b+1)}};$$

wherein M is the metric value, $\nabla P$ is the pressure differential of the soot filter, $P_s$ is a function of the ambient pressure, $\dot{m}$ is a function of the air flow and the fuel flow, T is a sensed temperature or a modeled temperature, $T_{ref}$ is a reference temperature value, k is a constant, and b is the constant accounting for an effect of turbulence.

20. A non-transitory computer readable medium configured to store software comprising:
   instructions to calculate a calculated soot load of a soot filter based upon a pressure differential, an ambient pressure, a temperature, an air flow, and a fueling information, said instructions accounting for a turbulent flow contribution to the pressure differential using an empirically determined constant; and
   instructions to initiate regeneration of the soot filter based upon the calculated soot load.

21. The computer readable medium according to claim 20 further comprising instructions to calculate a plurality of soot loads of the soot filter at a plurality of times.

22. The computer readable medium according to claim 20 further comprising instructions to terminate regeneration of the soot filter based upon a second calculated soot load.

23. The computer readable medium according to claim 20 in operative communication with a diesel engine.

24. The computer readable medium according to claim 20 wherein the instructions to calculate include instructions to calculate a value, M, according to the following equation:

$$M = \frac{\nabla P P_s}{\dot{m}^{2-b}\left(\frac{T}{T_{ref}}\right)^{k(b+1)}};$$

where $\nabla P$ is the pressure differential of the soot filter, $P_s$ is a function of the ambient pressure, $\dot{m}$ is a function of the air flow and the fuel flow, T is a sensed temperature or a modeled temperature, $T_{ref}$ is a reference temperature value, k is a constant, and b is the constant accounting for the effects of laminar flow and turbulent flow on the pressure differential.

* * * * *

UNITED STATES PATENT AND TRADEMARK OFFICE
CERTIFICATE OF CORRECTION

| | | |
|---|---|---|
| PATENT NO. | : 8,171,726 B2 | Page 1 of 1 |
| APPLICATION NO. | : 12/004464 | |
| DATED | : May 8, 2012 | |
| INVENTOR(S) | : Greg Henderson and Brent Engel | |

It is certified that error appears in the above-identified patent and that said Letters Patent is hereby corrected as shown below:

Col. 9, line 47 (Claim 3). Insert the word --a-- after "is"

Col. 10, line 25 (Claim 16). Following the number "16." Insert the word --A-- before "system comprising"

Signed and Sealed this
Twenty-fourth Day of July, 2012

David J. Kappos
*Director of the United States Patent and Trademark Office*